Aug. 5, 1958     P. AUDEMAR     2,846,208
LIQUID CENTRIFUGAL SPEEDOMETER
Filed March 24, 1954     2 Sheets-Sheet 1

Inventor
P. Audemar

Aug. 5, 1958  P. AUDEMAR  2,846,208
LIQUID CENTRIFUGAL SPEEDOMETER
Filed March 24, 1954  2 Sheets-Sheet 2
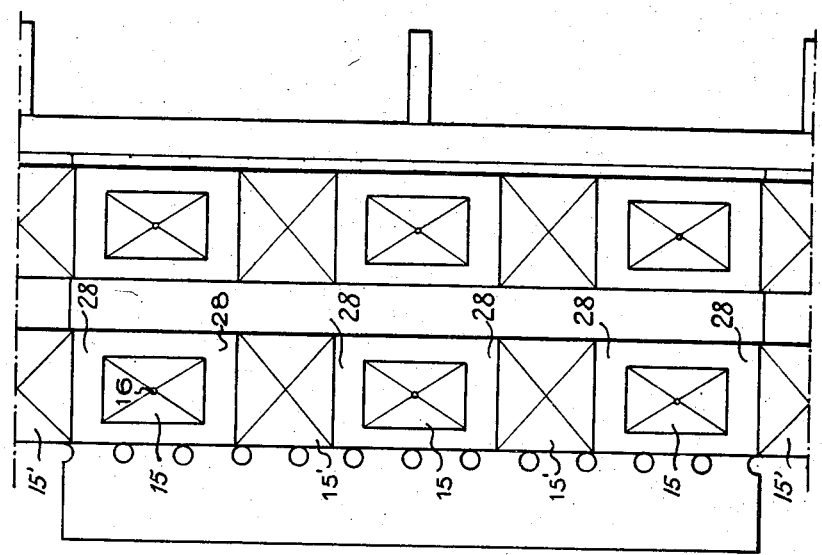
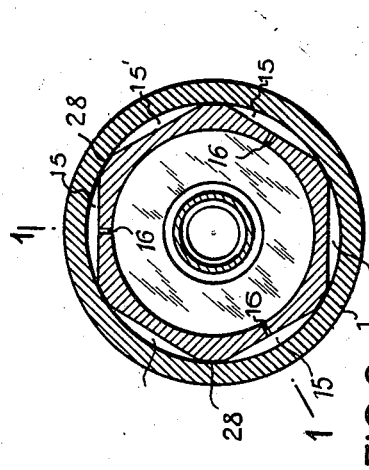
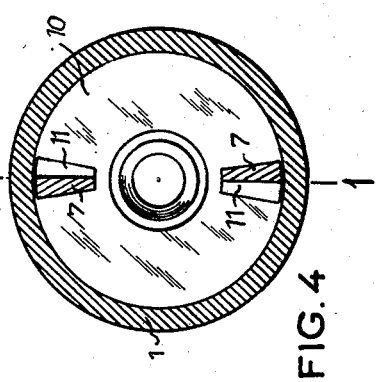
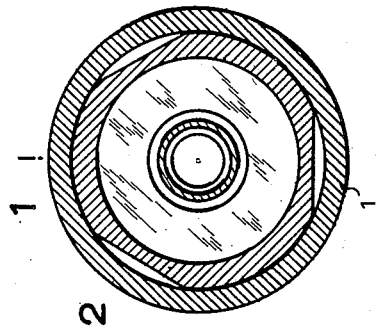
Inventor
P. Audemar

United States Patent Office 2,846,208
Patented Aug. 5, 1958

2,846,208
LIQUID CENTRIFUGAL SPEEDOMETER

Pierre Audemar, Mulhouse, France, assignor to Societe Alsacienne de Constructions Mecaniques, Mulhouse, Haut-Rhin, France, a French company Application March 24, 1954, Serial No. 418,451

Claims priority, application France April 2, 1953

1 Claim. (Cl. 264—19)

This invention relates to speedometers of the type in which a mass of liquid is rotated in a space between a cylinder and a piston by a shaft, of which the speed is to be measured, to form an annular centrifugal head of pressure, the axial component of which urges axially, through said piston, an index controlling member against the action of calibrated spring means.

In this type of speedometers, it is essential to reduce to a minimum the frictions of all kinds which otherwise would be capable of impairing the accuracy of the measures.

Now, the main sources of objectionable frictions are obviously the relative displacements between the piston and cylinder.

The main purpose of the invention is to suppress, or at least reduce to a minimum, the frictions between the piston and cylinder of a speedometer of the above-mentioned type.

An object of the invention is therefore to provide a speedometer of said type in which the piston and cylinder are both rotated with the shaft of which the speed is to be measured, which obviously suppresses any rotational friction between said piston and cylinder.

Another object of the invention is to interpose between said piston and cylinder a permanent film of liquid under pressure, so as to prevent any metal-to-metal contact between said piston and cylinder.

Still another object of the invention is to ensure the permanent presence of the above-mentioned pressure fluid film by providing the periphery of said piston with a fluid bearing continuously fed with liquid under pressure, when the whole assembly is being rotated, from a secondary centrifugal head fed, in turn, with excess liquid from the main one.

This last arrangement offers the additional advantage that the pressure in the liquid film is a function of the speed of rotation of the whole assembly, so that the speedometer is more sensitive at high speeds when the calibrated spring means are more strained, and frictions would otherwise be still more objectionable.

Still another object of the invention is to provide a speedometer of the type described, in which both centrifugal heads are fed in series from a container also rotating with the piston-cylinder assembly, so that the feeding rate is also a function of the speed of rotation of said assembly.

Still another object of the invention is to provide a speedometer of the type described, in which the calibrated elastic means are not rotated with the piston-cylinder assembly, which avoids the known drawbacks of the existing apparatus in which said elastic means are rotated and are liable to misadjustments or other malfunctions.

In speedometers of the type described, the piston and/or the cylinder are usually provided with fins in order to facilitate the formation of the main centrifugal head.

A further object of the invention, always with a view to reduce frictions to a minimum, is to ensure the driving connection between the cylinder and piston being exclusively through said fins by so relatively arranging and designing the same as to ensure interaction between those of the cylinder and those of the piston along the whole stroke of the latter.

Other objects and advantages of the invention will be apparent from the following detailed description, together with the accompanying drawings, submitted for purposes of illusrtation only and not intended to define the scope of the invention, reference being had for that purpose to the subjoined claim.

In these drawings:

Fig. 2 is a cross-sectional view along line 2—2 of Fig. 1.

Fig. 3 is a cross-sectional view along line 3—3 of Fig. 1.

Fig. 4 is a cross-sectional view along line 4—4 of Fig. 1 and

Fig. 5 is a developed view of the peripheral surface of piston 2.

Figure 1:
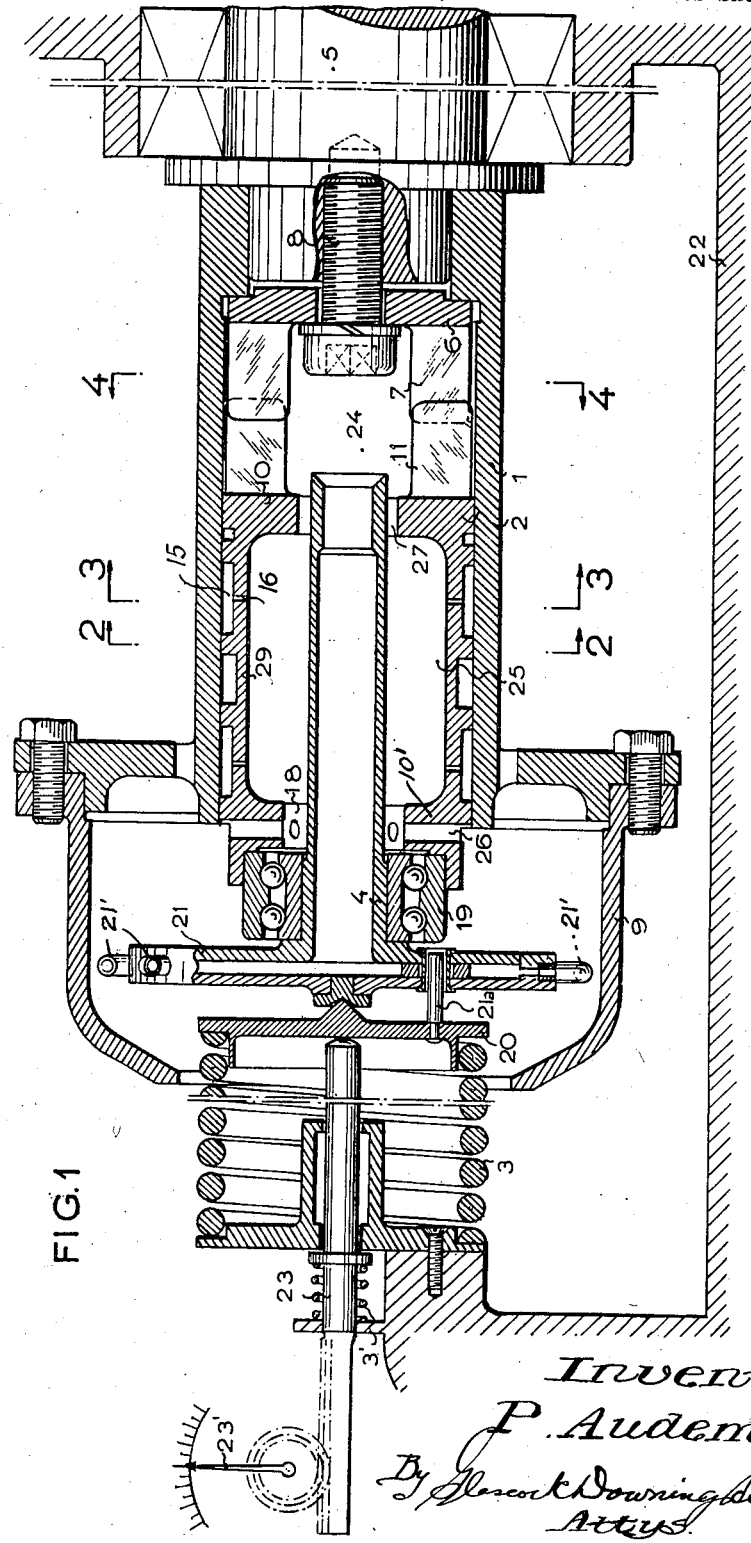
Fig. 1 is an axial sectional view of a speedometer according to the invention.

In the example shown, the shaft 5 of which the rotational speed is to be measured is journalled on one arm of a supporting bracket 22 on the other arm of which is slidably mounted a control member 23 adapted to actuate directly or through a suitable hydraulic follow-up system the index 23' of the speedometer. A cylinder 1 is fixedly secured on shaft 5 to rotate therewith around the same axis and a piston 2 slidably mounted in said cylinder 1 is journalled through a combined radial-axial ball bearing 19 on a stationary feeding duct 4 also coaxial with shaft 5. The end of cylinder 1 opposed to shaft 5 carries a liquid container 9 constituted by a revolution body still having the same axis as the shaft-cylinder-piston assembly. A kind of Pitot tube 21 fixedly mounted on the stationary duct 4 communicating therewith and prevented from rotating, as shown at 21a, is fed from the liquid in container 9 under rotation of the latter and feeds, in turn, through duct 4 extending through piston 2, the annular space 24 comprised between the head 6 of cylinder 1 adjacent to shaft 5 and that face 10 of piston 2 which faces said cylinder head. A calibrated spring 3 interposed between bracket 22 and a cup 20 centered on duct 4 continuously urges piston 2 towards the head 6 of cylinder 1. The head 6 is centered with respect to shaft 5 by means of an axial bolt 8. A return spring 3' continuously holds the index controlling member 23 in contact with cup 20. Fins 7 implanted in the cylinder head 6 extend towards piston 2, while conjugated fins 11 implanted in the face 10 of said piston 2 extend towards the cylinder head 6, both rows of fins being disposed in interpenetrating relation in all axial relative positions of the piston and cylinder.

The piston 2 is formed with an annular inner space 25 communicating at one end through a passage 18 and radial ports 26 with the container 9 and at its other end through an axial annular passage 27 surrounding the feed duct 4 with the annular space 24 in which is formed the main centrifugal head.

Now, the outer periphery of piston 2 is formed, in the example shown, with two axially spaced bearing surfaces each constituted by a first set of flat portions or pressure chambers 15 provided with central feeding nozzles 16 and a second set of flat portions or pressure chambers 15' each interposed between two chambers 15 to collect liquid therefrom for evacuation purposes. The diameter of the cylindrical portions 28 between the pressure chambers is slightly smaller than that of the inner wall of cylinder 1 to provide a slight annular clearance between the same and piston 2. A similar clearance is provided between the mid-portion 29 of the piston and its two extreme faces 10, 10', on the one hand, and the inner wall of cylinder 1, on the other hand.

The above-described speedometer operates as follows:

Upon rotation of the assembly comprising shaft 5, cylinder 1, piston 2 and container 9, liquid from the latter is forced into the Pitot tube 21 and the axial duct 4, thus feeding the annular space 24. The inlet ends 21' of the Pitot tube extend in a direction opposite to the direction of rotation of the container 9. The mass of liquid in said space, under the action of centrifugal force aided by the fins 7 and 11, rapidly takes the form of an annulus which constitutes a centrifugal head of pressure. The axial component of said pressure head varies as a function of the speed of rotation of shaft 5. Said axial component exerts a variable thrust on piston 2 which is thus urged towards the left (in Fig. 1) against the action of the calibrated spring 3. Any axial displacement of piston 2 causes to the same extent an axial displacement of the index controlling member 23 so that finally, the position of index 23' gives an indication of the rotational speed of shaft 5.

As piston 2 is displaced towards the left, the thickness of the annulus of liquid in space 24 tends to be reduced. However, since duct 4 continuously feeds said space 24 with liquid from container 9, a constant thickness of said liquid annulus is permanently maintained.

Now, said feeding through duct 4 with liquid from the container 9 is made at a rate sufficient not only to maintain a maximum constant thickness of the liquid annulus in the space 24, but also to ensure an over-flow through the axial annular passage 27 into the annular space 25. This mass of liquid is centrifugally forced towards the internal wall of the piston and penetrates through nozzles 16 into the chambers 15 of the bearing surfaces of piston 2 in which the liquid held under pressure by the action of the centrifugal force maintains piston 2 out of metal-to-metal contact with cylinder 1. From each chamber 15, the fluid is then evacuated towards an adjacent flat portion 15' and from the latter axially into container 9.

The excess of fluid fed into the annular space 25 of piston 2, if any, is brought back into container 9 through the axial annular passage 18 and the radial ports 26.

It is to be noted that the liquid mass in space 24 is driven from fins 7 and 11 nearly at the same speed as piston 2 and cylinder 1, so that there is practically no relative angular displacement between the annular mass of liquid generating the centrifugal head and both said piston and cylinder. Thus, the value of the axial pressure exerted on piston 2 and, therefore, the position of the index of the speedometer will not be substantially influenced by possible variations of the degree of viscosity of the liquid in space 24, e. g. due to variations of temperature.

While the invention has been described with particular reference to a preferred embodiment, it is not intended to limit the scope of the invention to the embodiment illustrated, nor otherwise than by the terms of the subjoined claim.

What is claimed is:

A speedometer for measuring the rotational speed of a shaft comprising, in combination, a cylinder having a closed end, coaxial and rotatively fast with said shaft, a hollow piston slidably mounted in said cylinder, means on said cylinder and on said piston to ensure driving of the latter from the former, a central bore in the face of said piston which is adjacent to said closed end of the cylinder, a first annular space between said piston face and said closed cylinder end, calibrated elastic means to continuously urge said piston towards said closed end of the cylinder, indexing means operatively connected with said piston to indicate its relative axial position in said cylinder, a second annular space within said piston, means to admit liquid into said annular spaces comprising an axial, non-rotatable duct mounted on said calibrated elastic means and freely accommodated through said central bore of said piston face adjacent said closed end of said cylinder, said second annular space being fed by the overflow from said first annular space through the clearance between said central bore and said axial non-rotatable duct, a plurality of chambers in the periphery of said piston, a plurality of nozzles to feed at least certain of said chambers from the liquid mass in said second annular space, means to continuously evacuate fluid from said chambers outside said piston and cylinder, an annular container coaxial with said cylinder and fixedly secured thereon to receive the overflow from said second annular space and from said chambers, at least one Pitot tube mounted on said non-rotatable duct, said Pitot tube having its inlet end extending adjacent the periphery of said container in a direction opposed to the direction of rotation of said container whereby liquid is scooped from said annular container and delivered through said duct, whereby upon rotation of said piston and cylinder the liquid mass of said first annular space forms an annular centrifugal head capable of displacing said piston axially against the action of said calibrated elastic means.

References Cited in the file of this patent

UNITED STATES PATENTS

| | | |
|---|---|---|
| 1,265,813 | Pharo | May 14, 1918 |
| 1,386,925 | Constantinesco | Aug. 9, 1921 |
| 2,457,999 | Hulbert | Jan. 4, 1949 |
| 2,573,403 | Church | Oct. 30, 1951 |
| 2,642,275 | Sollinger | June 16, 1953 |

FOREIGN PATENTS

| | | |
|---|---|---|
| 763 | Great Britain | Aug. 21, 1877 |
| 333,337 | Germany | Feb. 3, 1922 |
| 344,385 | Germany | Nov. 19, 1921 |